(12) United States Patent
Nakamuta et al.

(10) Patent No.: US 11,387,472 B2
(45) Date of Patent: Jul. 12, 2022

(54) ENERGY MANAGEMENT SYSTEM (71) Applicants: TOYOTA JIDOSHA KABUSHIKI KAISHA, Toyota (JP); AISIN SEIKI KABUSHIKI KAISHA, Kariya (JP)

(72) Inventors: Kei Nakamuta, Nisshin (JP); Hideshi Mizutani, Okazaki (JP); Keisuke Kikuchi, Nagoya (JP); Nobuyuki Orihashi, Toyota (JP); Tomio Yamanaka, Nagoya (JP); Atsushi Nakajima, Kariya (JP); Shinichi Yatsuzuka, Kariya (JP); Masayuki Suzuki, Kariya (JP); Hiroshi Toge, Kariya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/073,280

(22) Filed: Oct. 16, 2020

(65) Prior Publication Data
US 2021/0119231 A1    Apr. 22, 2021

(30) Foreign Application Priority Data

Oct. 18, 2019    (JP) .............................. JP2019-191413

(51) Int. Cl.
  *H01M 8/04*      (2016.01)
  *H01M 8/04089*   (2016.01)
  *H01M 8/04746*   (2016.01)
(52) U.S. Cl.
  CPC ... *H01M 8/04089* (2013.01); *H01M 8/04753* (2013.01)

(58) Field of Classification Search
  CPC ..................... H01M 8/04089; H01M 8/04753
  See application file for complete search history.

(56) References Cited

U.S. PATENT DOCUMENTS

2011/0195322 A1* 8/2011 Ukai ................. H01M 8/04955
                                                     429/410

FOREIGN PATENT DOCUMENTS

JP        2008217999 A    9/2008
JP        2009224114 A    10/2009

* cited by examiner

*Primary Examiner* — Olatunji A Godo
(74) *Attorney, Agent, or Firm* — Hunton Andrews Kurth LLP (57) ABSTRACT

The present disclosure provides an energy management system capable of improving energy efficiency. The energy management system includes: a fuel cell configured to supply energy used in a facility; a first hydrogen supply unit configured to supply hydrogen to the fuel cell by causing a power generation apparatus that uses renewable energy to perform water electrolysis; a second hydrogen supply unit configured to supply hydrogen to the fuel cell by reforming natural gas supplied via a pipeline; and a control unit configured to determine a ratio between hydrogen supplied from the first hydrogen supply unit to the fuel cell and hydrogen supplied from the second hydrogen supply unit to the fuel cell. The control unit determines the ratio in accordance with a percentage of heat energy and energy other than the heat energy with respect to the energy used in the facility.

3 Claims, 6 Drawing Sheets

ENERGY MANAGEMENT SYSTEM

CROSS REFERENCE TO RELATED APPLICATIONS

This application is based upon and claims the benefit of priority from Japanese patent application No. 2019-191413, filed on Oct. 18, 2019, the disclosure of which is incorporated herein in its entirety by reference.

BACKGROUND

The present disclosure relates to an energy management system.

In order to reduce greenhouse gases such as carbon dioxide, facilities such as airports have been discussing an introduction of a system that supplies energy using fuel cells. Japanese Unexamined Patent Application Publication No. 2009-224114 discloses a reformer that reforms a hydrocarbon-based fuel and a method for operating a Solid Oxide Fuel Cell (SOFC) system that generates power by using a reformed gas, the method including a process for supplying a hydrocarbon to an SOFC without passing the hydrocarbon through the reformer when the SOFC generates power.

SUMMARY

Hydrogen supplied to a fuel cell is produced by water electrolysis (the electrolysis of water) and reforming of methane contained in natural gas. Electric energy is required in order to produce hydrogen by water electrolysis, and supplying the electric energy by using a power generation apparatus that uses renewable energy such as solar power generation has been discussed. As the timing of power generation varies, the timing of hydrogen generation by water electrolysis cannot be controlled by the power generation apparatus that uses renewable energy. For this reason, in a system that supplies hydrogen to a fuel cell by causing the power generation apparatus that uses renewable energy to perform water electrolysis, the generated hydrogen is stored once in a hydrogen storage tank and is supplied to the fuel cell from the hydrogen storage tank when necessary.

In a system that supplies hydrogen to a fuel cell by reforming methane contained in natural gas, a large amount of heat is generated in a reforming process. The heat generated in the reforming process can be used as heat energy such as heating or a hot water supply. Energy used in a facility is divided into heat energy and energy other than the heat energy such as electric energy. It is assumed in a first case that only a system that supplies hydrogen to a fuel cell by causing a power generation apparatus that uses renewable energy to perform water electrolysis is installed in a facility. In the first case, all heat energy used in the facility has to be provided by performing a conversion of electrical energy generated by the fuel cell. Meanwhile, in a second case, it is assumed that only a system that supplies hydrogen to a fuel cell by reforming methane contained in natural gas is installed in a facility. In the second case, heat emitted in the reforming process can be used as heat energy used in the facility. However, when demand for heat energy in the facility is low, the heat emitted in the reforming process is discharged without being used. That is, energy efficiency in the facility needs to be further improved in both the first and second cases.

The present disclosure has been made in view of the aforementioned circumstances and an object thereof is to provide an energy management system capable of improving energy efficiency in a facility including energy supply equipment using a fuel cell.

A first exemplary aspect is an energy management system, including: a fuel cell configured to supply energy used in a facility; a first hydrogen supply unit configured to supply hydrogen to the fuel cell by causing a power generation apparatus that uses renewable energy to perform water electrolysis; a second hydrogen supply unit configured to supply hydrogen to the fuel cell by reforming natural gas supplied via a pipeline; and a control unit configured to determine a ratio between hydrogen supplied from the first hydrogen supply unit to the fuel cell and hydrogen supplied from the second hydrogen supply unit to the fuel cell, in which the control unit determines the ratio in accordance with a percentage of heat energy and energy other than the heat energy with respect to the energy used in the facility.

In the second hydrogen supply unit, a large amount of heat is emitted in the process for generating hydrogen. In the first hydrogen supply unit, an amount of heat less than that emitted in the second hydrogen supply unit is emitted in the process for generating hydrogen. Meanwhile, in a case in which heat emitted in the process for generating hydrogen is not considered, energy efficiency is enhanced when power is generated by supplying hydrogen from the first hydrogen supply unit to the fuel cell as compared to when power is generated by supplying hydrogen from the second hydrogen supply unit to the fuel cell. Therefore, the aforementioned ratio is determined in accordance with the percentage of heat energy and energy other than the heat energy with respect to the energy used in the facility. That is, when the percentage of the heat energy with respect to the energy used in the facility is relatively high, the percentage of the hydrogen supplied from the second hydrogen supply unit to the fuel cell is increased as compared to when the percentage of the heat energy is relatively low. By doing so, it is possible to improve energy efficiency in the facility including energy supply equipment using the fuel cell.

Further, the control unit increases a ratio of the hydrogen supplied from the second hydrogen supply unit to the fuel cell when demand for energy as heat energy is large. By doing so, it is possible to reuse a large amount of heat emitted at the time of reforming of natural gas in the second hydrogen supply unit.

Further, the energy management system may further include an acquisition unit configured to acquire information about weather and a disaster, in which the control unit may determine whether a supply of natural gas is stopped based on the information about weather and a disaster acquired by the acquisition unit, and the control unit may cause the fuel cell to be supplied with hydrogen only from the first hydrogen supply unit when it determines that the supply of natural gas is stopped. By doing so, it is possible to deal with the stoppage of a supply of natural gas due to a disaster or the like.

According to the present disclosure, it is possible to improve energy efficiency in a facility including energy supply equipment using a fuel cell.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

Hereinafter, although the present disclosure will be described with reference to embodiments of the present disclosure, the present disclosure according to claims is not limited to the following embodiments. Moreover, all the components described in the following embodiments are not necessarily essential as means for solving problems. For the clarification of the description, the following description and the drawings may be omitted or simplified as appropriate. Throughout the drawings, the same components are denoted by the same reference signs and repeated descriptions will be omitted as appropriate.

First Embodiment

Figure 1:
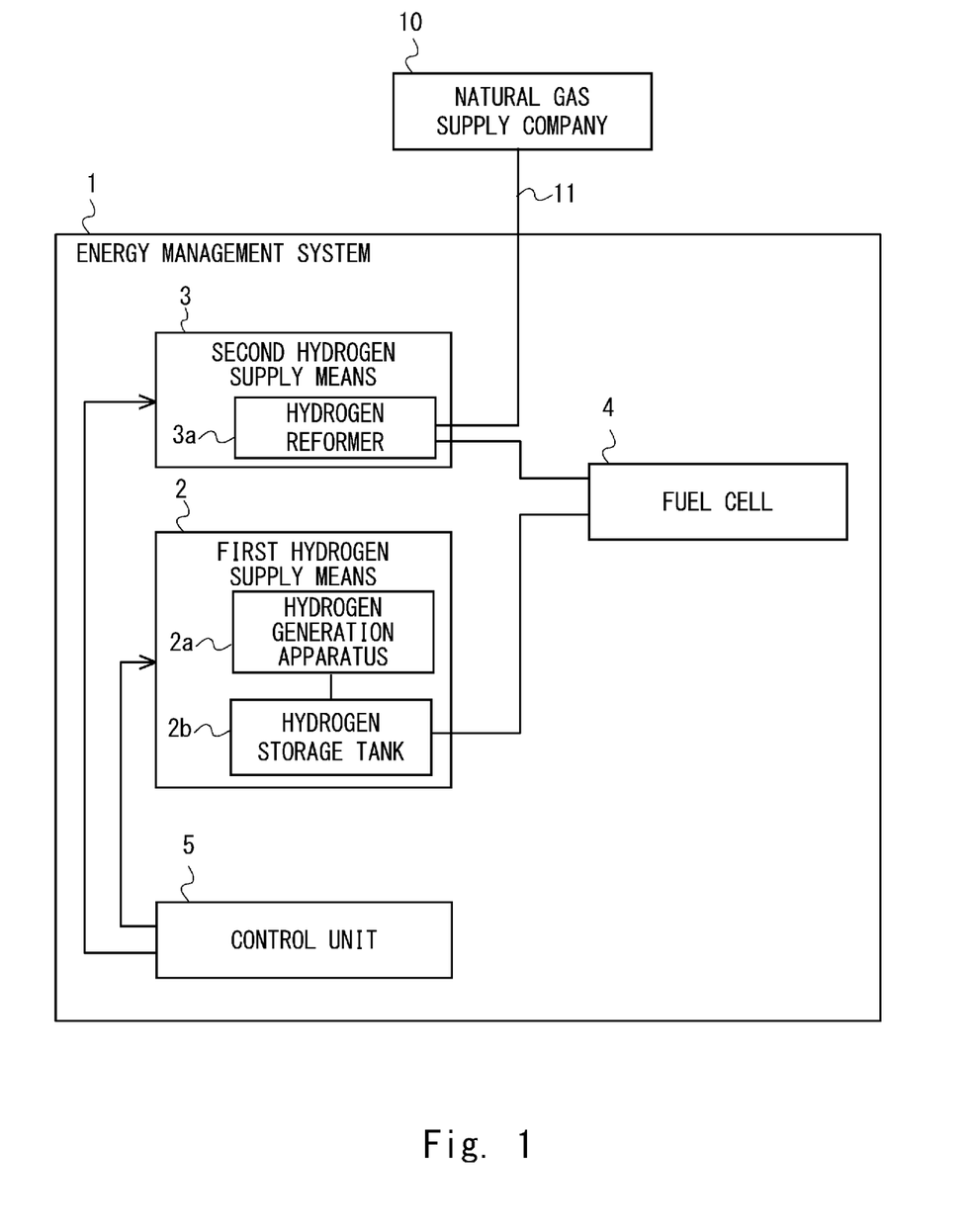
FIG. 1 is a block diagram showing a configuration of an energy management system according to a first embodiment.

First, a configuration of an energy management system according to a first embodiment is described. FIG. 1 is a block diagram showing the configuration of an energy management system 1 according to the first embodiment. As shown in FIG. 1, the energy management system 1 includes first hydrogen supply means 2, second hydrogen supply means 3, a fuel cell 4, and a control unit 5.

Figure 2:
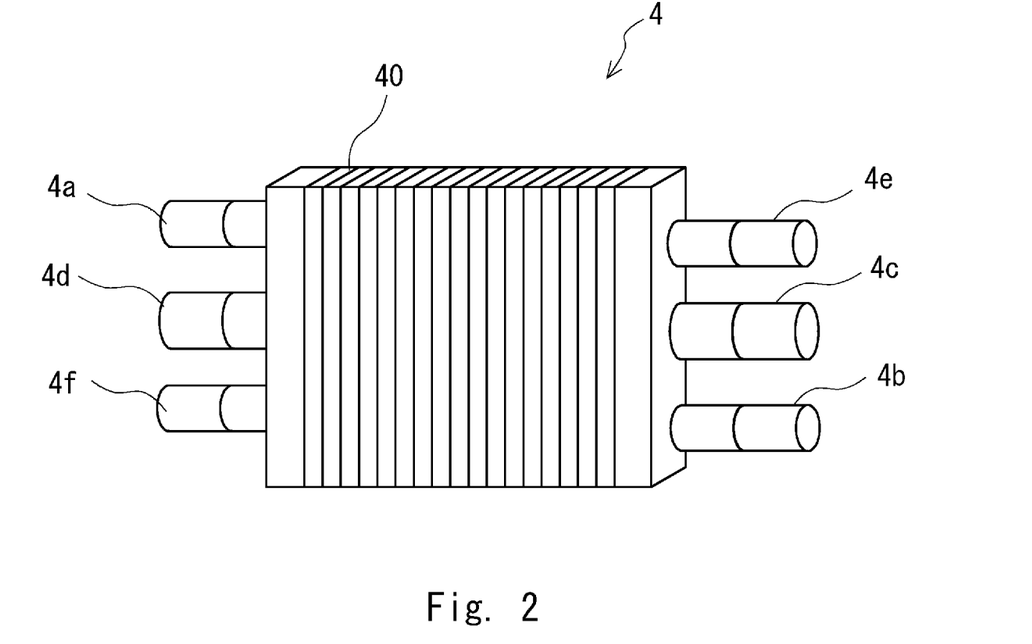
FIG. 2 is a schematic diagram showing a schematic configuration of a fuel cell included in the energy management system according to the first embodiment.

The fuel cell 4 supplies energy used in a facility. The fuel cell 4 is, for example, a Solid Oxide Fuel Cell (SOFC). FIG. 2 is a schematic diagram showing a schematic configuration of the fuel cell 4. As shown in FIG. 2, the fuel cell 4 is configured by stacking a plurality of fuel cell unit cells 40. Each of the fuel cell unit cells 40 is formed by sandwiching an electrolyte membrane such as a solid polymer ion exchange membrane between an anode electrode (fuel electrode) and a cathode electrode (oxidant electrode) from both sides thereof.

A fuel air inlet 4a, a fuel air outlet 4b, a cooling gas inlet 4c, a cooling gas outlet 4d, a fuel hydrogen inlet 4e, and a fuel hydrogen outlet 4f are provided in the fuel cell 4. A supply pipe and an exhaust pipe for fuel air are connected to the fuel air inlet 4a and the fuel air outlet 4b, respectively. A supply pipe and an exhaust pipe for fuel hydrogen are connected to the fuel hydrogen inlet 4e and the fuel hydrogen outlet 4f, respectively. A supply pipe and an exhaust pipe for cooling gas are connected to the cooling gas inlet 4c and the cooling gas outlet 4d, respectively. For example, air is used as cooling gas used to cool the fuel cell 4.

In the fuel cell 4, when an anode gas containing hydrogen is supplied to an anode electrode and air containing oxygen is supplied to a cathode electrode, hydrogen ions generated at the anode electrode due to a catalytic reaction pass through an electrolyte membrane and move to the cathode electrode, and hydrogen ions and oxygen cause a chemical reaction at the cathode electrode, to thereby generate power.

In the fuel cell 4, hydrogen is taken in via the first hydrogen supply means 2 or the second hydrogen supply means 3, and oxygen is taken in from the atmosphere.

Referring again to FIG. 1, the first hydrogen supply means 2 supplies hydrogen to the fuel cell 4 by causing a power generation apparatus that uses renewable energy to perform water electrolysis. It should be noted that the renewable energy refers to energy that always exists in nature, such as the light of the sun, the force of the wind, the heat of the earth, and other earth resources. Examples of the power generation apparatus that uses renewable energy include a solar power generation apparatus, a wind power generation apparatus, a geothermal power generation apparatus, a hydraulic power generation apparatus, and a biomass power generation apparatus. The power generation apparatus that uses renewable energy is assumed to be installed in a facility, and accordingly, when the facility is an airport, a solar power generation apparatus is considered to be suitable as the power generation apparatus that uses renewable energy. The first hydrogen supply means 2 includes a hydrogen generation apparatus 2a that generates hydrogen by performing water electrolysis, and a storage tank 2b that stores hydrogen generated by the hydrogen generation apparatus 2a.

The second hydrogen supply means 3 supplies hydrogen to the fuel cell 4 by reforming natural gas (city gas) supplied from a natural gas supply company 10 via a pipeline 11. The second hydrogen supply means 3 includes a hydrogen reformer 3a that produces hydrogen by steam reforming of methane contained in natural gas.

The control unit 5 determines a ratio between hydrogen supplied from the first hydrogen supply means 2 to the fuel cell 4 and hydrogen supplied from the second hydrogen supply means 3 to the fuel cell 4. The control unit 5 determines the aforementioned ratio in accordance with a percentage of heat energy and energy other than the heat energy with respect to the energy used in the facility.

As described above, in the hydrogen reformer 3a of the second hydrogen supply means 3, hydrogen is produced by steam reforming of methane. In a method for producing hydrogen by steam reforming of methane, methane ($CH_4$) contained in natural gas is chemically reacted with water ($H_2O$) in the hydrogen reformer 3a, to thereby produce hydrogen ($H_2$). This method is currently the most widely used industrial method for producing hydrogen. In order to improve the inversion rate of hydrocarbon in this chemical reaction, it is necessary to perform the chemical reaction in an atmosphere of a relatively high temperature (e.g., about 800° C.). As a result, in the second hydrogen supply means 3, a large amount of heat is emitted in the process for generating hydrogen. Meanwhile, in the first hydrogen supply means 2, an amount of heat less than that emitted in the second hydrogen supply means 3 is emitted in the process for generating hydrogen.

In a case in which heat emitted in the process for generating hydrogen is not considered, energy efficiency is enhanced when power is generated by supplying hydrogen from the first hydrogen supply means 2 to the fuel cell 4 as compared to when power is generated by supplying hydrogen from the second hydrogen supply means 3 to the fuel cell 4.

The heat emitted in the process for generating hydrogen in the second hydrogen supply means 3 can be utilized as heat energy used in the facility such as heating and a hot water supply. Thus, when demand for energy as heat energy is large, the ratio of hydrogen supplied from the second hydrogen supply means 3 to the fuel cell 4 is increased. That is, when the percentage of the heat energy with respect to the energy used in the facility is relatively high, the percentage of the hydrogen supplied from the second hydrogen supply means 3 to the fuel cell 4 is increased as compared to when the percentage of the heat energy is relatively low. In this way, the control unit 5 determines the aforementioned ratio in accordance with the percentage of heat energy and energy other than the heat energy with respect to the energy used in the facility. Thus, it is possible to improve energy efficiency in the facility including energy supply equipment using the fuel cell 4.

Figure 3:
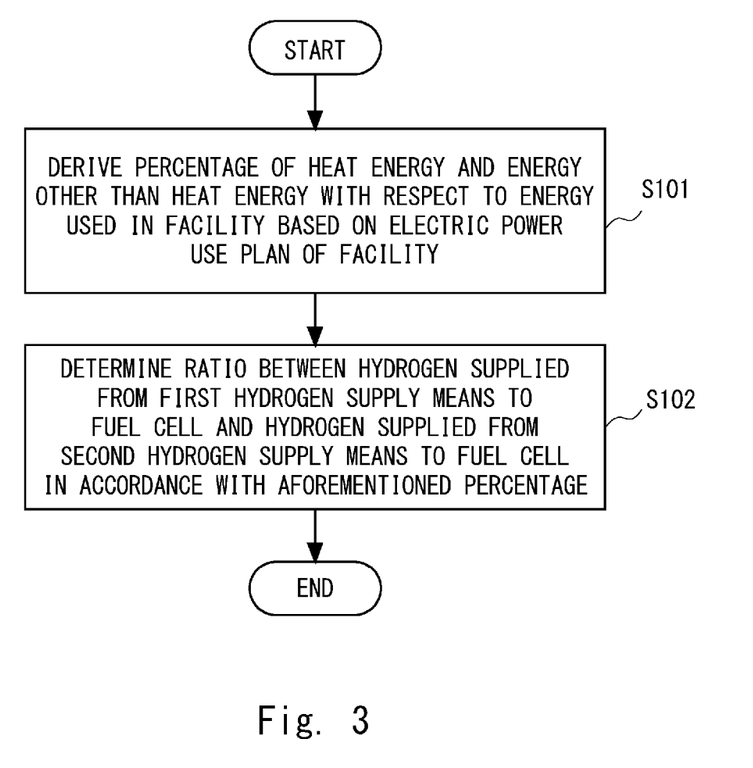
FIG. 3 is a flowchart showing a processing flow of the energy management system according to the first embodiment.

Next, a processing flow of the energy management system 1 is described below. Note that in the following description, FIG. 1 is referred to as appropriate. FIG. 3 is a flowchart showing the processing flow of the energy management system 1. As shown in FIG. 3, first, the control unit 5 derives a percentage of heat energy and energy other than the heat energy with respect to energy used in a facility based on an electric power use plan of the facility prepared in advance (Step S101). Next, the control unit 5 determines, in accordance with the aforementioned percentage, a ratio between hydrogen supplied from the first hydrogen supply means 2 to the fuel cell 4 and hydrogen supplied from the second hydrogen supply means 3 to the fuel cell 4 (Step S102).

As described above, in the energy management system 1 according to the first embodiment, when energy supplied from the fuel cell 4 is used as heat energy, the second hydrogen supply means 3 having a large calorific value is selected, and when the energy supplied from the fuel cell 4 is used as energy other than heat energy such as electric energy, the first hydrogen supply means 2 having a small calorific value is selected. By doing so, it is possible to improve energy efficiency in the facility including energy supply equipment using the fuel cell 4.

Second Embodiment

Figure 4:
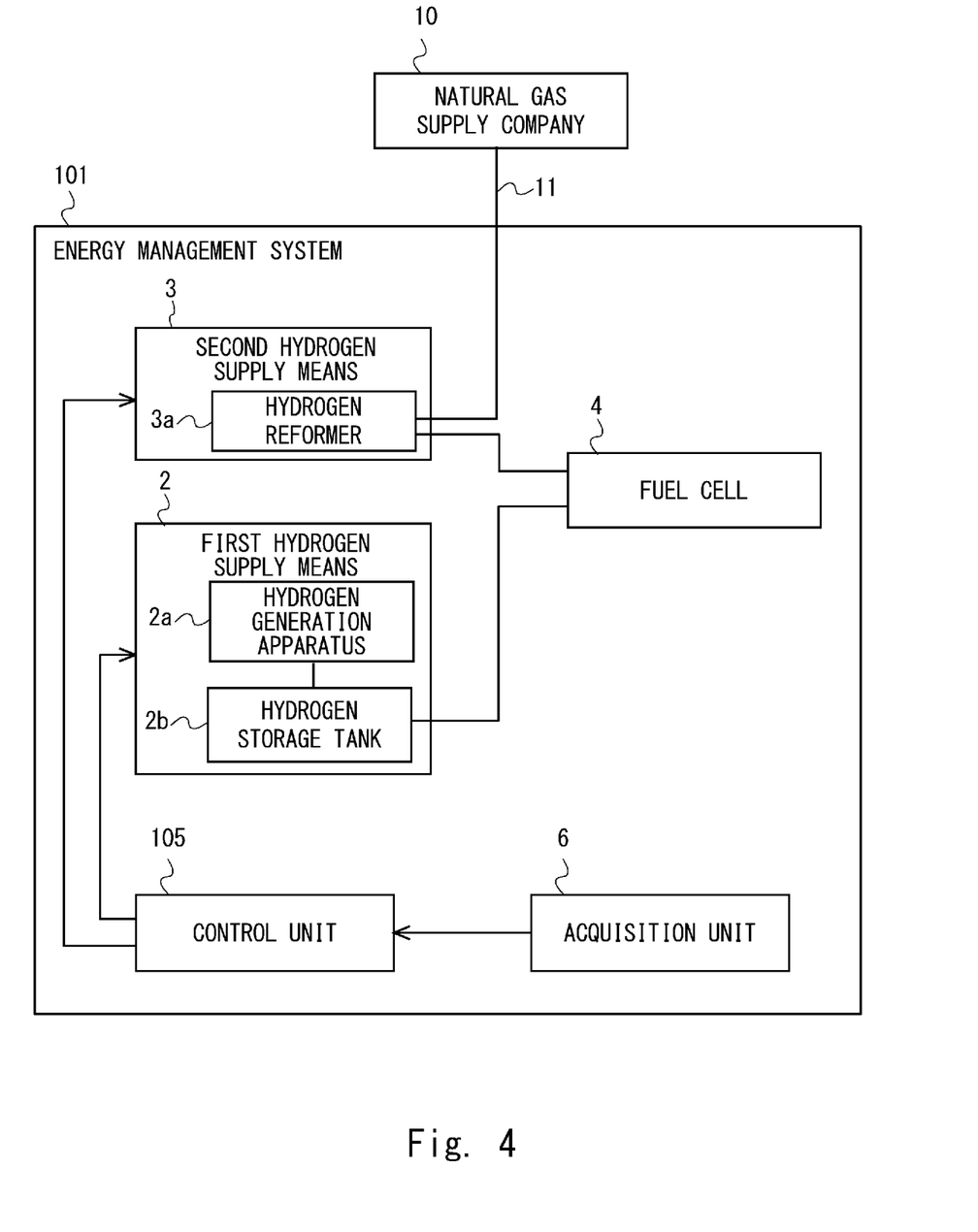
FIG. 4 is a block diagram showing a configuration of an energy management system according to a second embodiment.

First, a configuration of an energy management system according to a second embodiment is described. FIG. 4 is a block diagram showing the configuration of an energy management system 101 according to the second embodiment. As shown in FIG. 4, the energy management system 101 includes the first hydrogen supply means 2, the second hydrogen supply means 3, the fuel cell 4, a control unit 105, and an acquisition unit 6. That is, the configuration of the energy management system 101 is different from that of the energy management system 1 in that the energy management system 101 further includes the acquisition unit 6 and the control unit 5 (see FIG. 1) is replaced by the control unit 105. The configuration of the energy management system 101 other than that described above is the same as that of the energy management system 1 according to the first embodiment described with reference to FIG. 1.

The acquisition unit 6 acquires information about weather and a disaster. The control unit 105 performs switching between two operation modes (a normal mode and a disaster mode) based on the information about weather and a disaster acquired by the acquisition unit 6. That is, the control unit 105 determines whether a supply of natural gas from the natural gas supply company 10 is stopped based on the information about weather and a disaster when the operation is being performed in the normal mode, and switches the operation mode to the disaster mode when it determines that the supply of natural gas is stopped. On the other hand, in a case in which the control unit 5 determines that the supply of natural gas from the natural gas supply company 10 is not stopped (a supply is resumed) based on the information about weather and a disaster when the operation is being performed in the disaster mode, the control unit 5 switches the operation mode to the normal mode.

When the operation mode is the normal mode, the control unit 105, like the control unit 5 according to the first embodiment, determines a ratio between hydrogen supplied from the first hydrogen supply means 2 to the fuel cell 4 and hydrogen supplied from the second hydrogen supply means 3 to the fuel cell 4. That is, the control unit 105 determines the aforementioned ratio in accordance with a percentage of heat energy and energy other than the heat energy with respect to the energy used in the facility. On the other hand, when the operation mode is the disaster mode, the control unit 105 causes the fuel cell 4 to be supplied with hydrogen only from the first hydrogen supply means 2.

Next, a processing flow of the energy management system 101 is described below. Note that in the following description, FIG. 4 is referred to as appropriate.

Figure 5:
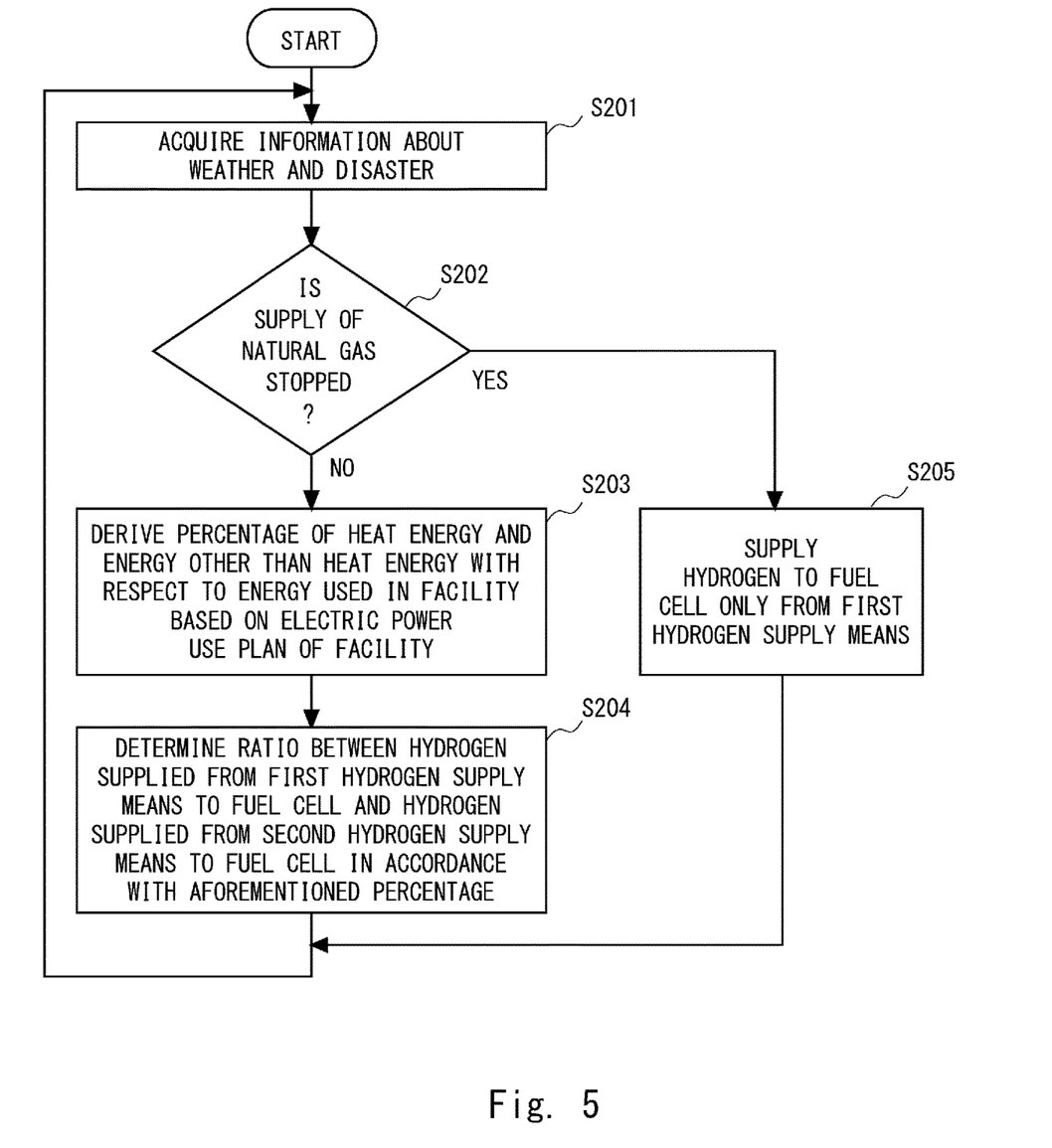
FIG. 5 is a flowchart showing a processing flow of the energy management system according to the second embodiment.

FIG. 5 is a flowchart showing the processing flow of the energy management system 101. As shown in FIG. 5, first, the acquisition unit 6 acquires information about weather and a disaster (Step S201). Next, the control unit 105 determines whether a supply of natural gas from the natural gas supply company 10 is stopped (Step S202).

When the control unit 105 determines in Step S202 that the supply of natural gas is not stopped, the control unit 105 derives a percentage of heat energy and energy other than the heat energy with respect to energy used in a facility based on an electric power use plan of the facility (Step S203). Then, subsequent to Step S203, the control unit 105 determines, in accordance with the aforementioned percentage, a ratio between hydrogen supplied from the first hydrogen supply means 2 to the fuel cell 4 and hydrogen supplied from the second hydrogen supply means 3 to the fuel cell 4 (Step S204), and the process returns to Step S201.

If the control unit 105 determines in Step S202 that the supply of natural gas is stopped, the control unit 105 causes the fuel cell 4 to be supplied with hydrogen only from the first hydrogen supply means 2 (Step S205), and then the process returns to Step S201.

By doing the above, it is possible to deal with the stoppage of a supply of natural gas due to a disaster or the like.

Reference Embodiment

If the power generation apparatus that uses renewable energy is a solar power generation apparatus, a reference mode described below is conceivable.

Figure 6:
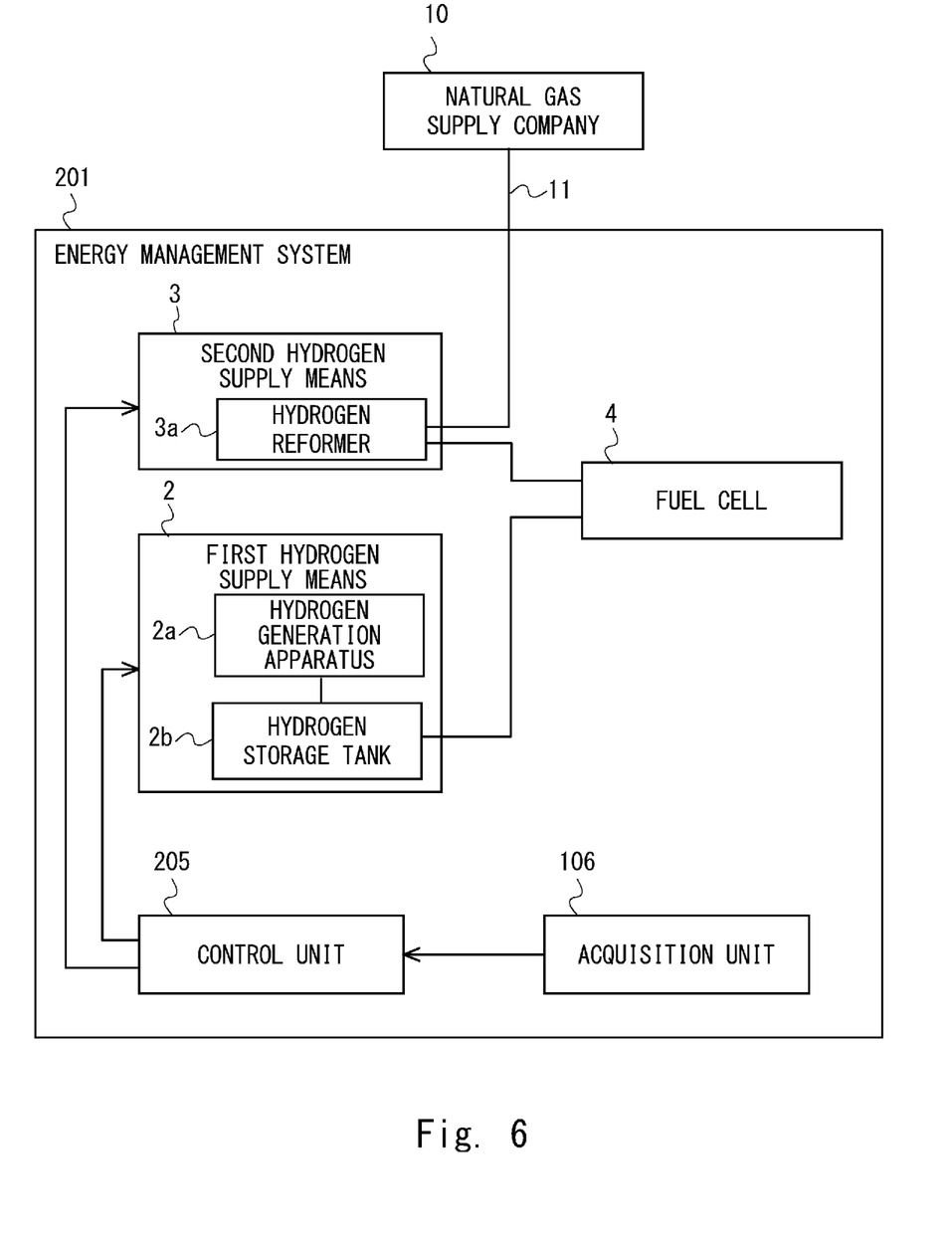
FIG. 6 is a block diagram showing a configuration of an energy management system according to a reference embodiment.

FIG. 6 is a block diagram showing a configuration of an energy management system 201 according to the reference embodiment. As shown in FIG. 6, the energy management system 201 includes the first hydrogen supply means 2, the second hydrogen supply means 3, the fuel cell 4, a control unit 205, and an acquisition unit 106. That is, the configuration of the energy management system 201 is the same as that of the energy management system 1 according to the first embodiment, except that the energy management system 201 further includes the acquisition unit 106 and the control unit 5 (see FIG. 1) is replaced by the control unit 205. The acquisition unit 106 acquires information about the amount of power generated by the solar power generation apparatus. The control unit 205 selects the first hydrogen supply means 2 during a time period in which the amount of power generated by the solar power generation apparatus is sufficiently large, such as when the weather is fine in the daytime, while it selects the second hydrogen supply means 3 during a time period in which the amount of power generated by the solar power generation apparatus is small, such as at nighttime or when the weather is cloudy. By doing so, it is possible to select the hydrogen supply means while taking the status of power generated by the solar power generation apparatus into consideration.

Note that the present disclosure is not limited to the aforementioned embodiments and may be changed as appropriate without departing from the spirit of the present disclosure.

For example, while the present disclosure has been described as a hardware configuration in the above embodiments, the present disclosure is not limited thereto. The present disclosure may also be implemented by causing a processor, such as a Central Processing Unit (CPU), to load a computer program stored in a memory and execute any processing of the energy management system.

In the above-described examples, the program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g., magneto-optical disks), CD-ROM (Compact Disc Read Only Memory), CD-R (CD-Recordable), CD-R/W (CD-ReWritable), and semiconductor memories (such as mask ROM, PROM (Programmable ROM), EPROM (Erasable PROM), flash ROM, RAM (Random Access Memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. An energy management system, comprising:
   a fuel cell configured to supply energy used in a facility;
   a first hydrogen supply unit configured to supply hydrogen to the fuel cell by causing a power generation apparatus that uses renewable energy to perform water electrolysis;
   a second hydrogen supply unit configured to supply hydrogen to the fuel cell by reforming natural gas supplied via a pipeline; and
   a control unit configured to determine a ratio between hydrogen supplied from the first hydrogen supply unit to the fuel cell and hydrogen supplied from the second hydrogen supply unit to the fuel cell, wherein
   the control unit determines the ratio in accordance with a percentage of heat energy and energy other than the heat energy with respect to the energy used in the facility.

2. The energy management system according to claim 1, wherein the control unit increases a ratio of the hydrogen supplied from the second hydrogen supply unit to the fuel cell when demand for energy as heat energy is large.

3. The energy management system according to claim 1, further comprising an acquisition unit configured to acquire information about weather and a disaster, wherein
   the control unit determines whether a supply of natural gas is stopped based on the information about weather and a disaster acquired by the acquisition unit, and the control unit causes the fuel cell to be supplied with hydrogen only from the first hydrogen supply unit when it determines that the supply of natural gas is stopped.

\* \* \* \* \*